(12) United States Patent
Lau

(10) Patent No.: US 10,496,461 B2
(45) Date of Patent: Dec. 3, 2019

(54) APPARATUS AND METHOD FOR HARDWARE INITIATION OF EMULATED INSTRUCTIONS

(75) Inventor: David Yiu-Man Lau, San Jose, CA (US)

(73) Assignee: ARM Finance Overseas Limited, Cambridge (GB)

( * ) Notice: Subject to any disclaimer, the term of this patent is extended or adjusted under 35 U.S.C. 154(b) by 928 days.

(21) Appl. No.: 13/161,354

(22) Filed: Jun. 15, 2011

(65) Prior Publication Data

US 2012/0323552 A1    Dec. 20, 2012

(51) Int. Cl.
*G06F 9/455* (2018.01)
*G06F 11/07* (2006.01)
*G06F 9/38* (2018.01)

(52) U.S. Cl.
CPC ......... *G06F 11/0721* (2013.01); *G06F 9/455* (2013.01); *G06F 9/45504* (2013.01); *G06F 11/0772* (2013.01); *G06F 9/3865* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 4,926,322 A * | 5/1990 | Stimac | G06F 12/0623 703/23 |
| 5,632,028 A * | 5/1997 | Thusoo et al. | 703/26 |
| 5,799,165 A * | 8/1998 | Favor | G06F 9/3812 712/214 |
| 5,941,991 A * | 8/1999 | Kageshima | G06F 11/24 703/20 |
| 6,012,129 A | 1/2000 | Hartner et al. | |
| 6,263,412 B1 | 7/2001 | Townsend | |
| 6,442,725 B1 | 8/2002 | Schipke et al. | |
| 6,862,565 B1 | 3/2005 | Zheng | |
| 7,260,815 B1 * | 8/2007 | Chen et al. | 717/134 |
| 7,647,589 B1 * | 1/2010 | Dobrovolskiy | G06F 11/3644 710/260 |
| 8,359,422 B2 * | 1/2013 | Ali | G06F 9/455 711/159 |
| 8,423,834 B2 * | 4/2013 | Sasazaki | G06F 11/1068 714/48 |
| 8,447,958 B2 * | 5/2013 | Kissell | G06F 9/30167 712/226 |
| 9,703,562 B2 * | 7/2017 | Rash | G06F 9/30145 |
| 2004/0210748 A1* | 10/2004 | Liang | G06F 9/30094 712/229 |
| 2005/0004446 A1* | 1/2005 | Cowan et al. | 600/407 |
| 2006/0117316 A1* | 6/2006 | Cismas | G06F 9/3851 718/103 |

(Continued)

OTHER PUBLICATIONS

International Search Report and Written Opinion issued to International Patent Application No. PCT/US2012/042608, dated Aug. 30, 2012, 7 pgs.

*Primary Examiner* — Kibrom K Gebresilassie
(74) *Attorney, Agent, or Firm* — Patterson Thuente Pedersen, P.A.

(57) ABSTRACT

A method of emulating an instruction includes identifying a fault instruction. The fault instruction is saved in a register. The fault instruction is associated with a software emulated operation. The software emulated operation is initiated with an access to the fault instruction in the register.

6 Claims, 2 Drawing Sheets

(56) References Cited

U.S. PATENT DOCUMENTS

| | | | |
|---|---|---|---|
| 2007/0150673 A1* | 6/2007 | Rajaram | G06F 9/3802 |
| | | | 711/154 |
| 2010/0312991 A1* | 12/2010 | Norden | G06F 9/3001 |
| | | | 712/205 |
| 2010/0332910 A1* | 12/2010 | Ali | G06F 9/455 |
| | | | 714/45 |
| 2011/0208505 A1* | 8/2011 | Mayhew | G06F 1/3203 |
| | | | 703/26 |
| 2012/0124271 A1* | 5/2012 | Evans | G06F 12/1027 |
| | | | 711/6 |
| 2012/0296626 A1* | 11/2012 | Bond | G06F 9/45545 |
| | | | 703/26 |
| 2013/0138864 A1* | 5/2013 | Ali | G06F 9/455 |
| | | | 711/6 |
| 2014/0281398 A1* | 9/2014 | Rash | G06F 9/3017 |
| | | | 712/208 |
| 2016/0378678 A1* | 12/2016 | Lemay | G06F 12/1009 |
| | | | 711/163 |
| 2017/0083326 A1* | 3/2017 | Burger | G06F 9/268 |

\* cited by examiner

APPARATUS AND METHOD FOR HARDWARE INITIATION OF EMULATED INSTRUCTIONS

FIELD OF THE INVENTION

This invention relates generally to the processing of computer instructions. More particularly, this invention relates to hardware initiation of emulated instructions.

BACKGROUND OF THE INVENTION

Ideally, computer instructions are executed by hardware resources, which are very fast. However, there are some circumstances in which hardware execution of computer instructions is not possible. For example, a software program may include a new instruction that is intended for a new version of a hardware resource. An old version of the same hardware resource does not implement the new instruction. Therefore, when the old version of the hardware resource tries to execute the new instruction, an exception is taken. In such an event, a software exception handler is invoked to implement the new instruction in software. To support this type of compatibility, the software exception handler must be updated with drivers to emulate new instructions.

Another common circumstance in which hardware execution of a computer instruction is not possible is in connection with floating point operations. It is not uncommon for a floating point unit hardware designer to decide not to support obscure operations because they require so many hardware resources. Instead, the hardware designer may decide to support obscure operations in software. In such a case, the floating point unit throws an exception in response to a request for an obscure operation. The obscure operation is subsequently emulated in software.

Another instance in which hardware execution of a computer instruction is not possible is in virtualized environment. Virtualization refers to the creation of a virtual, rather than an actual, version of something, such as a hardware platform, operating system, a storage device or a network resource. For example, a computer that is running Microsoft® Windows® may host a virtual machine that looks like a computer with an Apple® operating system. Subsequently, Apple® compliant software can be executed on the virtual machine.

In hardware virtualization, the term host machine refers to the actual machine on which the virtualization takes place. The term guest machine refers to the virtual machine. The software or firmware that creates a virtual machine on the host machine is called a hypervisor.

When an instruction of a guest machine is received by the host machine, an exception is thrown. This results in a call to the hypervisor. The hypervisor looks up the instruction in memory and then executes a software implementation of the function associated with the instruction. Thus, the instruction fault initiates a software call to the hypervisor, which subsequently initiates a memory call to look up the instruction. This sequence of calls is relatively time consuming. Since there are many such calls to a virtual machine, host machine processing is substantially strained.

This problem of initiating a memory call to look up an unsupported instruction also occurs in the previously discussed examples of unsupported instructions processed by legacy hardware resources and unsupported instructions processed by a floating point unit. In each instance, the memory call consumes many processing cycles and therefore degrades system performance.

Accordingly, it would be desirable to provide improved techniques for initiating the processing of instructions that are not executed in hardware.

SUMMARY OF THE INVENTION

A method of emulating an instruction includes identifying a fault instruction. The fault instruction is saved in a register. The fault instruction is associated with a software emulated operation. The software emulated operation is initiated with an access to the fault instruction in the register.

A machine includes a processor with a fault register to store a fault instruction. A memory is connected to the processor. The memory includes instructions executable by the processor to initiate a software emulated operation with an access to the fault instruction in the fault register.

A processor includes a fault register to store a fault instruction. An exception handler invokes a software emulated operation utilizing the fault instruction from the fault register.

A computer readable storage medium includes executable instructions to define a processor. A fault register stores a fault instruction. An exception handler invokes a software emulated operation utilizing the fault instruction from the fault register.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
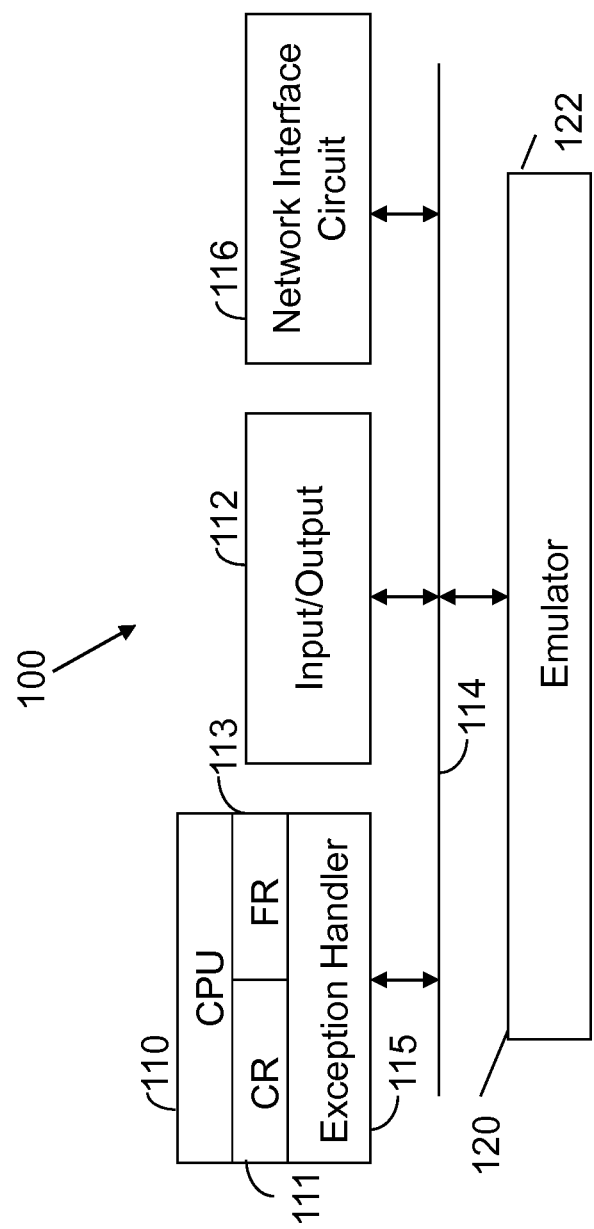
FIG. 1 illustrates a computer configured in accordance with an embodiment of the invention.

FIG. 1 illustrates a computer 100 implemented in accordance with an embodiment of the invention. The computer 100 is a host machine with a central processing unit 110. The central processing unit 110 includes a configuration register (CR) 111, a fault register (FR) 113 and an exception handler 115. The configuration register 111 includes one or more bits to indicate that the computer 100 is configured to support hardware initiation of emulated instructions. For example, the configuration register 111 specifies the presence of the fault register 113.

The fault register 113 saves an instruction that has caused a fault. Thereafter, the exception handler 115 initiates a software emulation of operation corresponding to the instruction. This operation is initiated in hardware (e.g., by the fault register 113 and the exception handler 115), thus the instruction does not have to be looked up in memory, as is the case in prior art systems. This hardware based invocation of software emulated instructions accelerates processing.

The computer 100 also includes input/output devices 112, which are connected to the CPU 110 via a bus 114. The input/output devices 112 may include a keyboard, mouse, display, printer and the like. A network interface circuit 116 is also connected to the bus 114. The network interface circuit 116 allows the computer 100 to operate in a networked environment.

A memory 120 is also connected to the bus 114. The memory 120 stores a software emulator 122. The software emulator may be a stand alone module or may be a segment of a larger program, such as a hypervisor, which may be used to implement a guest machine.

Figure 2:
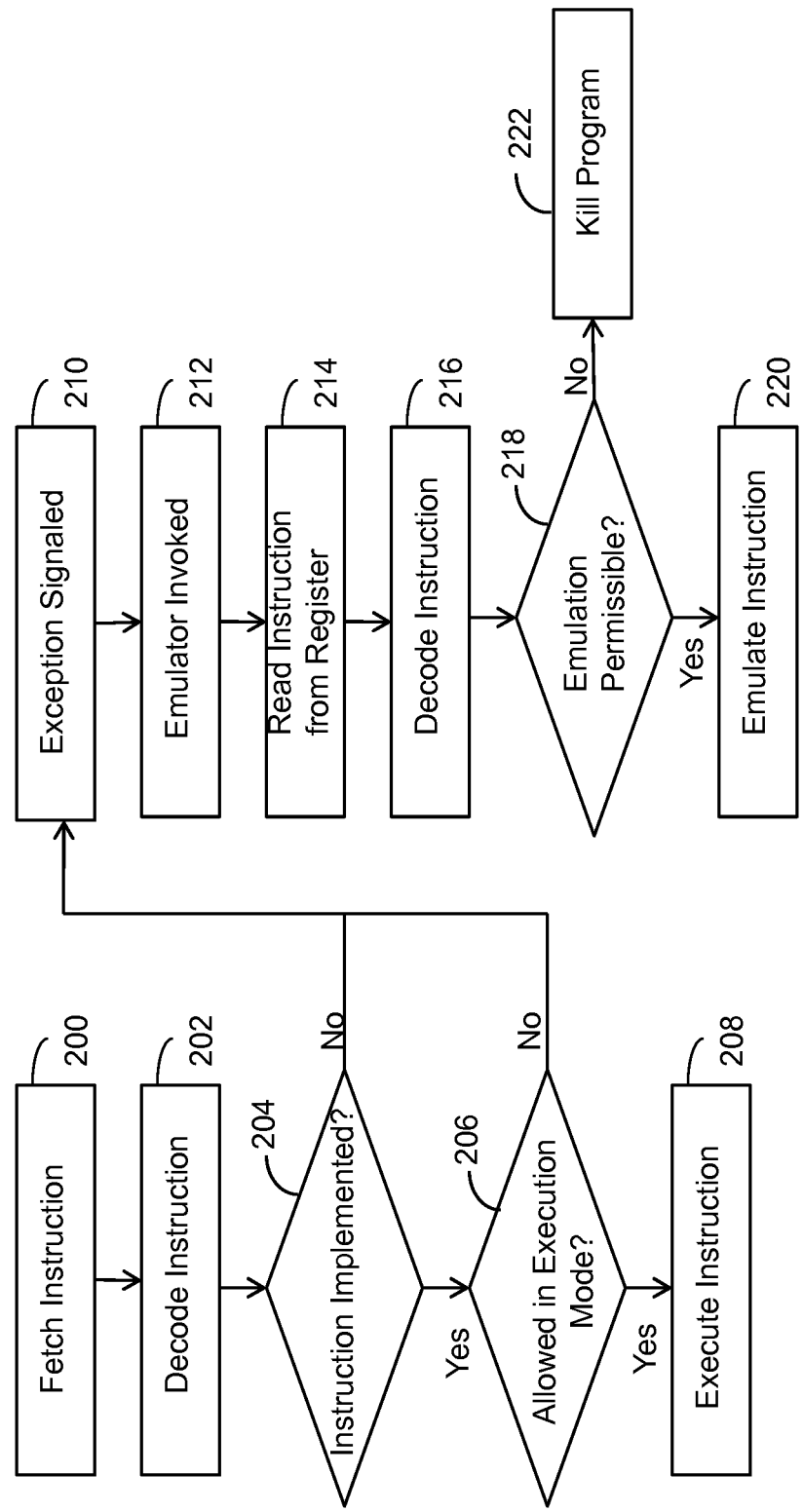
FIG. 2 illustrates processing operations associated with an embodiment of the invention.

FIG. 2 illustrates processing operations associated with an embodiment of the invention. The CPU 110 fetches an instruction 200. The CPU 110 subsequently decodes the instruction 202. It is then determined whether the instruction is implemented in hardware 204. If so (204—YES), it is determined whether the instruction is allowed in execution mode 206. If so (206—YES), the instruction is executed 208. If a Boolean NO state occurs at block 204 or 206, an exception is signaled 210. The exception handler 115 then invokes the software emulator 212. Observe that up to this point all operations are performed in hardware (e.g., by CPU 110). After this point, software (e.g., emulator 122) controls processing.

The software emulator 122 reads the instruction from the fault register 214. Thus, the software emulator 122 does not fetch the instruction from memory 120, as is the case in the prior art. Instead, the software emulator 122 accesses a hardware resource—the fault register 113. Therefore, even though the emulation operation is controlled by software (e.g., the emulator 122), processing is initiated with hardware—the value in the fault register 113. This saves many processing cycles.

The instruction retrieved from the fault register 113 is then decoded 216. The emulator 122 then determines if emulation is possible 218. If so (218—YES), the instruction is emulated in software 220. If not (218-NO), the program is killed 222 or some other remedial action is taken.

In one embodiment, the fault register 113 is a register that captures the most recent instruction which caused an instruction validity exception, an execution exception or an addressing exception. Example instruction validity exceptions include coprocessor unusable, reserved instruction, guest privileged sensitive instruction, guest field change and guest reserved instruction redirect. Example execution exceptions include integer overflow, trap, system call, breakpoint, floating point, coprocessor 2 exception and hypercall. Example addressing exceptions include address error, Translation Look-aside Buffer (TLB) refill, TLB invalid, TLB read inhibit, TLB execute inhibit and TLB modified.

In one embodiment, the fault register is only set by exceptions which are synchronous to an instruction. Typically, the fault register is not set by interrupts, machine checks, bus errors, cache error exceptions or EJTAG exceptions.

When a synchronous exception occurs for which there is no valid instruction word (e.g., TLB Refill—Instruction Fetch), the value stored in the fault register may be labeled UNPREDICTABLE.

As previously indicated, the presence of the fault register 113 may be indicated by a bit in a configuration register 111. In one embodiment, the fault register 113 is part of the virtualization support associated with the CPU 110. In other embodiments the fault register 113 supports floating point unit operations and legacy compatibility with new software releases intended for new hardware resources.

The fault register 113 may be implemented as a 32 bit value. Instruction words smaller than 32 bits may be placed in bits 15:0, with bits 31:16 containing zeroes.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.).

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A method of emulating an instruction, comprising:
    fetching an instruction with a processor;
    decoding the fetched instruction with the processor;
    determining, prior to execution of the decoded instruction, whether the decoded instruction is executable by a hardware resource within or coupled to the processor;
    when it is determined that the decoded instruction is executable by the hardware resource, identifying, with the processor, prior to execution of the decoded instruction, a fault instruction by determining whether the decoded instruction is allowed in an execution mode, and executing the decoded instruction when the decoded instruction is allowed in the execution mode, and, upon identifying the fault instruction when the decoded instruction is not allowed in the execution mode:
        saving the fault instruction in a fault register on the processor,
        associating the fault instruction in the fault register on the processor with a software emulated operation,
        signaling an exception and invoking a software emulator in memory connected to the processor via a bus and executable on the processor in response to the exception,
        reading, using the software emulator, the fault instruction in the fault register on the processor,
        decoding, using the software emulator, the read fault instruction,
        determining, using the software emulator, whether emulation of the decoded fault instruction stored in the fault register is possible, executing, using the software emulator, the software emulated operation when it is determined that emulation of the fault instruction stored in the fault register is possible.

2. The method of claim 1 further comprising executing the software emulated operation to support a floating point unit operation.

3. A machine, comprising:
a processor including a fault register to store a fault instruction and a configuration register to specify the presence of the fault register; and
a memory connected to the processor via a bus, the memory including instructions executable by the processor to:
fetch an instruction with the processor,
decode the fetched instruction with the processor,
determine, prior to execution of the decoded instruction, whether the decoded instruction is executable by a hardware resource within or coupled to the processor,
when it determined that the instruction is executable by the hardware resource, identify, with the processor prior to execution of the decoded instruction, a fault instruction by determining whether the decoded instruction is allowed in an execution mode, and execute the decoded instruction when the decoded instruction is allowed in the execution mode, and, upon identifying the fault instruction when the decoded instruction is not allowed in the execution mode:
save the fault instruction in the fault register,
associate the fault instruction in the fault register with a software emulated operation,
signal an exception and invoke a software emulator in the memory and executable on the processor in response to the exception,
read, with the software emulator, the fault instruction in the fault register,
decode, with the software emulator, the read fault instruction,
determine, with the software emulator, whether emulation of the fault instruction stored in the fault register is possible, and
execute with the software emulator the software emulated operation when it is determined that emulation of the fault instruction in the fault register is possible.

4. The machine of claim 3 wherein the emulated operation is a floating point unit operation.

5. A processor, comprising:
a fault register to store a fault instruction;
a configuration register to specify the presence of the fault register;
logic executable by the processor to:
fetch an instruction with the processor,
decode the fetched instruction with the processor,
determine, prior to execution of the decoded instruction, whether the decoded instruction is executable by a hardware resource within or coupled to the processor,
when it determined that the instruction is executable by the hardware resource, identify a fault instruction prior to execution of the decoded instruction by determining whether the decoded instruction is allowed in an execution mode, and execute the decoded instruction when the decoded instruction is allowed in the execution mode, and signaling an exception if the decoded instruction is not allowed in the execution mode, and
save the identified fault instruction in the fault register of the processor; and
an exception handler to invoke a software emulated operation utilizing the fault instruction from the fault register, and determine using a software emulator executable on the processor whether emulation of the fault instruction is possible.

6. A non-transitory computer readable storage medium including executable instructions to define a processor, the processor including a fault register to store a fault instruction, a configuration register to specify the presence of the fault register, the non-transitory computer readable storage medium comprising:
logic executable by the processor to:
fetch an instruction with the processor,
decode the fetched instruction with the processor,
determine, prior to execution of the decoded instruction, whether the decoded instruction is executable by a hardware resource in or coupled to the processor,
when it determined that the instruction is executable by the hardware resource, identify a fault instruction by determining whether the decoded instruction is allowed in an execution mode, and executing the decoded instruction when the decoded instruction is allowed in the execution mode, and signaling an exception if the decoded instruction is not allowed in the execution mode, and
save the identified fault instruction in the fault register; and
an exception handler to invoke a software emulated operation in memory connected to the processor via the bus and utilizing an access by a software emulator executable on the processor to the fault instruction from the fault register, and to determine, by the software emulator, whether emulation of the fault instruction is possible.

* * * * *